United States Patent [19]

Davis

[11] Patent Number: 4,680,110

[45] Date of Patent: * Jul. 14, 1987

[54] FILTER BLOCK MOUNTED FUEL PROCESSOR APPARATUS

[75] Inventor: Leland L. Davis, Saline, Mich.

[73] Assignee: Davco Manufacturing Corporation, Ann Arbor, Mich.

[*] Notice: The portion of the term of this patent subsequent to Jan. 31, 2001 has been disclaimed.

[21] Appl. No.: 624,413

[22] Filed: Jun. 25, 1984

Related U.S. Application Data

[63] Continuation-in-part of Ser. No. 573,292, Jan. 23, 1984, Pat. No. 4,539,109, which is a continuation-in-part of Ser. No. 463,041, Feb. 1, 1983, Pat. No. 4,495,069, which is a continuation-in-part of Ser. No. 287,149, Jul. 27, 1981, Pat. No. 4,428,351.

[51] Int. Cl.$^4$ ............................................. B01B 35/18
[52] U.S. Cl. .................................. 210/114; 210/184; 210/305; 210/312; 123/557
[58] Field of Search ............... 210/114, 115, 184, 187, 210/232, 303–306, 312, DIG. 17; 123/557

[56] References Cited

U.S. PATENT DOCUMENTS

| Re. 26,186 | 4/1967 | McQuerry | 123/557 |
|---|---|---|---|
| 14,386 | 3/1856 | Blair | 123/557 |
| 916,003 | 3/1909 | Osborn | 123/557 |
| 1,133,845 | 3/1915 | Farnsworth | 123/557 |
| 1,318,068 | 10/1919 | Giesler | 123/557 |
| 1,623,074 | 4/1927 | Tartrais | 123/557 |
| 1,866,970 | 7/1932 | Garland et al. | 210/184 |
| 2,068,395 | 1/1937 | Burckhalter et al. | 210/184 |
| 2,070,189 | 2/1937 | Webster | 123/557 |
| 2,084,743 | 6/1937 | Rathbun | 123/557 |
| 2,207,399 | 7/1940 | Gaertner | 210/312 |
| 2,377,988 | 6/1945 | Braun | 210/184 |
| 2,408,605 | 10/1946 | Brookes | 123/557 |
| 2,437,453 | 3/1948 | Belgau | 219/36 |
| 2,747,555 | 5/1956 | Brunner | 123/557 |
| 2,917,285 | 12/1959 | Schack | 123/557 |
| 2,942,855 | 6/1960 | Wellensiek | 123/557 |
| 2,980,172 | 4/1961 | Thompson | 123/557 |
| 3,282,429 | 11/1966 | Wood et al. | 210/DIG. 17 |

(List continued on next page.)

FOREIGN PATENT DOCUMENTS

| 495157 | 8/1953 | Canada . |
|---|---|---|
| 563799 | 12/1923 | France . |
| 840643 | 1/1938 | France . |
| 356178 | 10/1937 | Italy . |
| 513329 | 2/1955 | Italy . |
| 687872 | 2/1953 | United Kingdom . |
| 831235 | 3/1960 | United Kingdom . |
| 1255831 | 12/1971 | United Kingdom . |
| 1422646 | 1/1976 | United Kingdom . |
| 1505405 | 3/1978 | United Kingdom . |
| 2051288A | 1/1981 | United Kingdom . |
| 1593565 | 7/1981 | United Kingdom . |

*Primary Examiner*—John Adee
*Attorney, Agent, or Firm*—Harness, Dickey & Pierce

[57] ABSTRACT

A fuel processor device is described which is particularly adapted for replacing existing fuel filters of diesel powered machines and fuel consuming devices. The fuel processor designs described have inlet and outlet passages within their upper surface and include a lower plate assembly which provides a mounting location for various elements such as water sensors, drain valves, temperature sensors and heaters which are provided in accordance with the user's needs. The lower plate assembly may be mounted directly to a housing by a through bolt or matching threads or may be made integral with the fuel processor housing. The fuel processor device may include an integral throwaway filter element or the element may be integrated with the fuel processor housing. Various control means may be employed in connection with the fuel processor disclosed wherein the automatic drain water or other accumulated impurities from the lower portion of the fuel processor housing. Additionally, heaters and heater control elements can be installed to aid in fuel water separation and prevent fuel waxing. Since these fuel processors are adapted to be mounted to existing mounting provisions, the requirement of a remotely mounted fuel processor is avoided and therefore the provision of additional fuel lines and fittings is eliminated.

35 Claims, 13 Drawing Figures

U.S. PATENT DOCUMENTS

| | | | |
|---|---|---|---|
| 3,354,872 | 11/1967 | Gratzmuller | 123/557 |
| 3,447,511 | 6/1969 | Beard et al. | 123/557 |
| 3,568,835 | 3/1971 | Hansen | 210/115 |
| 3,616,885 | 11/1971 | Priest | 210/184 |
| 3,743,096 | 7/1973 | Harvey, Jr. | 210/DIG. 17 |
| 3,768,730 | 10/1973 | Campbell | 165/40 |
| 3,883,428 | 5/1975 | Waring | 210/94 |
| 3,913,543 | 10/1975 | Richard | 123/557 |
| 3,925,204 | 12/1975 | Cheysson et al. | 210/187 |
| 3,935,901 | 2/1976 | Virgil | 165/52 |
| 3,962,999 | 6/1976 | Rehm | 165/71 |
| 4,003,356 | 1/1977 | Naylor | 123/557 |
| 4,015,567 | 4/1977 | Zabenskie | 123/557 |
| 4,027,639 | 6/1977 | Amano | 123/557 |
| 4,044,742 | 8/1977 | Linder | 123/557 |
| 4,045,349 | 8/1977 | Humbert, Jr. | 210/DIG. 17 |
| 4,052,307 | 10/1977 | Humbert, Jr. | 210/DIG. 17 |
| 4,072,138 | 2/1978 | Hawkins et al. | 123/557 |
| 4,091,265 | 5/1978 | Richards et al. | 210/184 |
| 4,091,782 | 5/1978 | Dunnam | 123/557 |
| 4,146,002 | 3/1979 | Quinn | 123/557 |
| 4,237,850 | 12/1980 | Connor et al. | 123/557 |
| 4,264,442 | 4/1981 | Jackson | 210/86 |
| 4,321,136 | 3/1982 | Matsui | 210/86 |
| 4,326,491 | 4/1982 | Burchett | 123/557 |
| 4,326,492 | 4/1982 | Leibrand, Sr. et al. | 123/557 |
| 4,354,946 | 10/1982 | Warlick et al. | 210/774 |
| 4,368,716 | 1/1983 | Davis | 123/557 |
| 4,386,596 | 6/1983 | Tuckey | 123/557 |
| 4,395,996 | 8/1983 | Davis | 123/557 |
| 4,420,342 | 12/1983 | Harris | 210/114 |
| 4,421,090 | 12/1983 | Davis | 123/557 |
| 4,428,351 | 1/1984 | Davis | 123/557 |
| 4,452,695 | 6/1984 | Schmidt | 210/DIG. 17 |
| 4,502,955 | 3/1985 | Schaupp | 210/184 |
| 4,502,956 | 3/1985 | Wilson | 210/312 |
| 4,522,712 | 6/1985 | Fischer et al. | 210/DIG. 17 |

FILTER BLOCK MOUNTED FUEL PROCESSOR APPARATUS

CROSS-REFERENCE TO RELATED APPLICATIONS

This application is a continuation-in-part of application Ser. No. 573,292 filed on Jan. 23, 1984, which matured into U.S. Pat. No. 4,539,109, issued on Sept. 3, 1985, which itself was a continuation-in-part of application Ser. No. 463,041, filed on Feb. 1, 1983, which matured into U.S. Pat. No. 4,495,069 on Jan. 22, 1985, which itself was a continuation-in-part of application Ser. No. 287,149, filed on July 27, 1981, which matured into U.S. Pat. No. 4,428,351. This application is further a continuation-in-part of the above-mentioned application Ser. No. 463,041, filed on Feb. 1, 1983, which matured into U.S. Pat. No. 4,495,069 on Jan. 22, 1985.

BACKGROUND AND SUMMARY OF THE INVENTION

This invention relates to a fuel processor device and particularly, to such a device suitable for use in connection with existing fuel filter mounting provisions of internal combustion engines and other fuel consuming devices.

In the past, when diesel fuel and other hydrocarbon fuels were plentiful and comparatively inexpensive, there were relatively few problems with the quality of fuel. Refineries, distributors, and retailers were careful to keep water out of fuel and they usually did not pump out the heavy settlings from the bottom of the storage tanks. In more recent times, however, fuel suppliers have been providing fuel with increased proportions of water and other contaminants. Also, in the past, kerosene and other fuels with lower paraffin formation (cloud) and pour points were blended with diesel fuel for cold weather use. Fuel allocations due to government regulations, fuel stock availability, refinery capacity and other factors have now made it almost impossible to continue this practice. The result of these developments has been a tendency toward lower quality diesel fuel containing substantially more impurities such as water, waxes, paraffins, heavier compounds and particulate matters which are very disruptive to the proper operation of fuel oil using devices.

In order to overcome the above-mentioned fuel quality problems, operators of diesel equipment are incorporating fuel conditioning devices to serve as water separators and/or impurity filters. Several of such devices are described by my issued U.S. Pat. Nos. 4,368,716; 4,428,351; 4,395,996; 4,421,090 and by my copending U.S. patent applications Ser. Nos. 463,041 and 573,292. These patents and applications are hereby incorporated by reference. The devices constructed according to the teachings of these patents and copending applications provide excellent water separation and filtration performance, These devices are essentially stand-alone units which are mounted remotely from the engine or associated fuel consuming apparatus. Such remote mounting requires a mounting location, the use of mounting hardware and fuel conduit connection provisions.

Many motor vehicle engines and other fuel consuming devices have filter head assemblies to which a particulate filter is mounted. Existing filter assemblies are generally of two types. One type is the so-called spin-on filter assembly which employs an integral filter element inside a throw-away canister which is threaded onto a boss on the filter head assembly. Another type of filter is the cartridge type fuel filter which employs an outer canister having an internal replaceable filter element. The cartridge type fuel filter device is normally held in position on the filter head assembly by using a through bolt which engages a threaded bore in the filter head assembly.

In view of the foregoing, it is an object of this invention to provide a fuel processing apparatus which may be interchanged for, and mounted directly to, conventional fuel filter mounting structures. By this approach, a fuel processor which is simple to install, inexpensive, and effective is provided. It is a further object of this invention to provide such a fuel processor device which may indicate the presence of water within the processor device and/or may automatically cause such water or other impurities to be drained from the fuel processor apparatus as required.

In accordance with this invention, a number of embodiments of fuel processor devices are provided which can be attached directly to filter head assemblies to replace existing conventional or spin-on type fuel filters. In accordance with one embodiment of this invention, a filter housing is provided having a removable lower assembly which provides for a drain and water sensor. A heater and thermostat assembly may also be included or omitted from the lower assembly as desired. This assembly may also include an automatic drain to remove water or other impurities from the lower portion of the filter housing when the level therein accumulates to a predetermined level. Other embodiments according to this invention describe various means for attaching the fuel processor components within the lower portion of the processor housing, and various approaches toward fixing a fuel filter media element within the processor assembly.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figures 1, 2, 3:
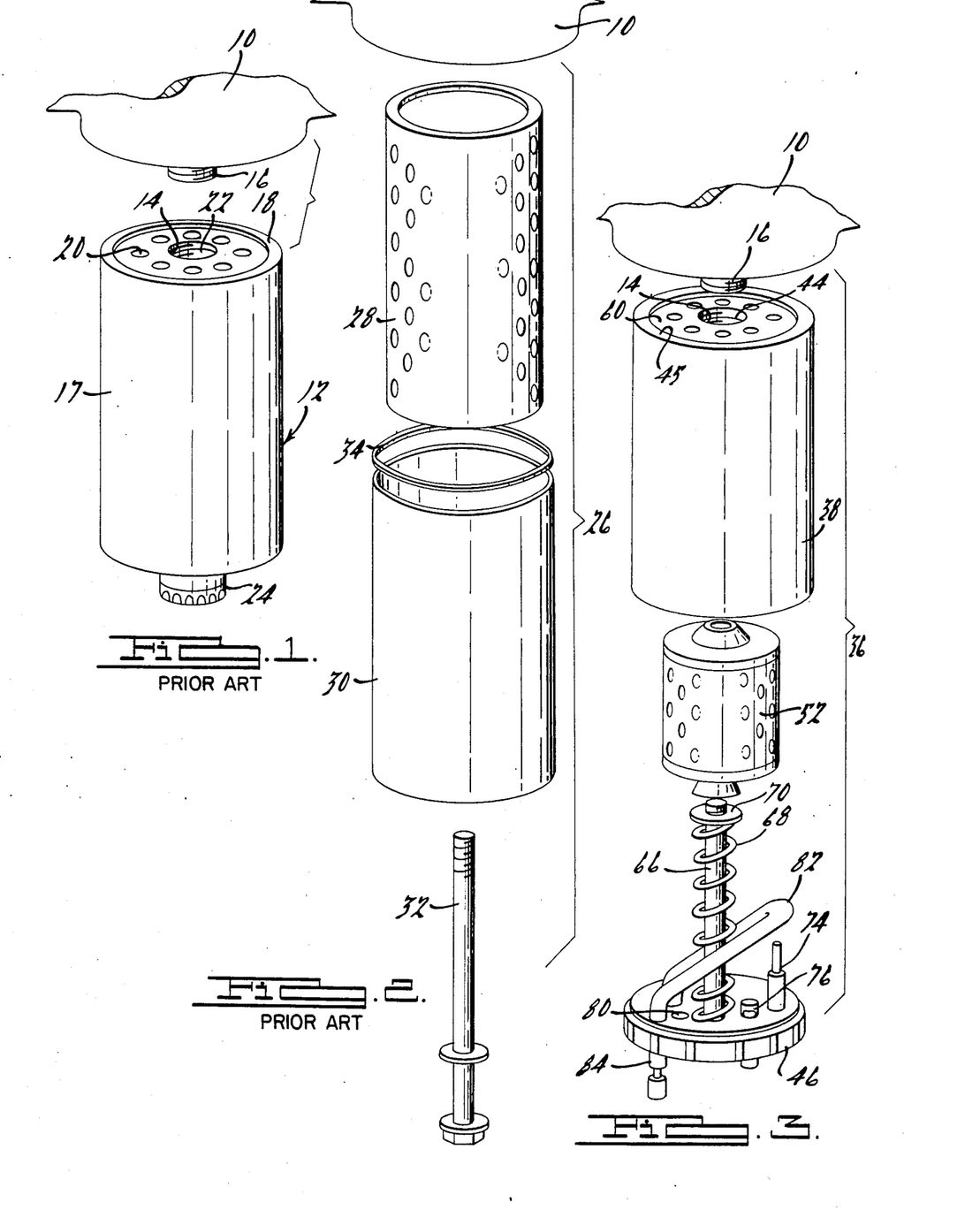
FIG. 1 illustrates a conventional spin-on type fuel filter shown in an exploded position from the corresponding filter head assembly.
FIG. 2 illustrates a conventional cartridge type fuel filter apparatus also exploded from the associated mounting structure.
FIG. 3 is an exploded pictorial view of the fuel processor device according to the first embodiment of this invention of the type for replacing a spin-on type filter.

FIGS. 1 and 2 depict existing conventional fuel filters, each of which are mounted to filter mounting block 10. FIG. 1 shows a spin-on type fuel filter 12. This filter includes an integral filter element and canister 17 which is mounted to filter mounting block 10 through engagement between threaded bore 14 and threaded boss 16. Sealing element 18 positioned around the periphery of filter 12, prevents fuel leakage. Spin-on type filter 12 includes a plurality of fuel inlet passages 20 and central outlet passage 22. Filter 12 is also shown equipped with a manually operated drain valve 24 which permits the user to periodically release quantities of water or other contaminants which may collect in the lower portion of filter 12.

Another type of conventional fuel filter, shown by FIG. 2, is the so-called cartridge or two piece type filter assembly 26. Cartridge fuel filter 26 differs from spin-on filter 12 in that the internal filter media element 28 is replaceable, whereas housing 30 is reusable. Mounting of cartridge fuel filter 26 is achieved by inserting through bolt 32 into a bore within housing 30 and threadingly engaging a threaded bore within filter mounting block 10. This filter type also includes sealing element 34 positioned at the junction between filter mounting block 10 and housing 30.

Figure 4:
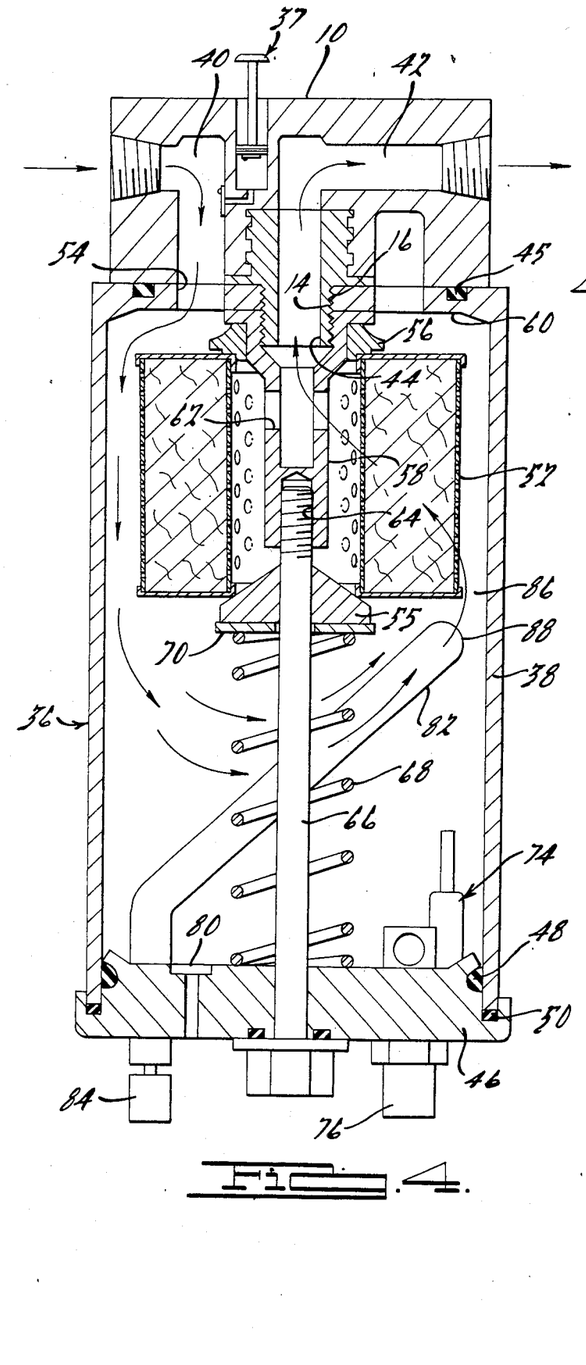
FIG. 4 is a longitudinal sectional view of the fuel processor device shown by FIG. 3 in an assembled configuration.

Now with reference to FIGS. 3 and 4, a fuel processor device according to this invention is described which is adapted for mounting to filter mounting block 10. Fuel processor 36 according to this first embodiment is particularly adapted for use with vehicles or other fuel consuming devices which are designed to accept a spin-on type fuel filter assembly 12 as described in connection with FIG. 1. Fuel processor 36 includes housing 38 which is mounted by threading bore 14 onto threaded boss 16. The details of filter block 10 are best shown with reference to FIG. 4. Filter block 10, which may be an existing structure or may be an installed component, includes filter inlet passage 40 and filter outlet passage 42. Mounting block 10 may include a priming pump, as generally indicated by reference character 37 which pressurizes the inlet passages to force fuel into filter outlet passage 42. Filter inlet passage 40 forms an annular passageway thereby supplying fuel to each of inlet passages 54. A portion of filter outlet passage 42 is formed by a bore within threaded boss 16.

Fuel processor 36 is adapted to be mounted to filter mounting block 10 of the type usable for a spin-on type filter. Fuel processor 36 includes housing 38 which has an enclosed upper end with a plurality of inlet passages 54 and a centrally disposed outlet port 44. The lower opened end of housing 38 is enclosed by plate 46 and is sealed against housing 38 by seals 48 and 50. Disposed internally within housing 38 is filter media element 52 which is compressed between ring seals 55 and 56. Ring 56 is attached to stanpipe 58 which includes an internal passageway in communication with outlet port 44 and includes a plurality of radially spaced ports 62. Stanpipe 58 is attached to upper plate 60 of fuel processor 36. The lower extending end of stanpipe 58 includes an internally threaded bore 64 which enables threaded through bolt 66 to engage therewith. Filter media element 52 is retained in sealing engagement with ring seals 55 and 56 through compression of coil spring 68 which is placed around through bolt 66. Alternately, spring 68 can be replaced with any suitable tensioning or mounting device. Washer 70 is located at the contact surface between coil spring 68 and seal ring 55 to uniformly compress the seal.

According to a principal aspect of this invention, filter media element 52 is disposed substantially within the upper internal portion of housing 38. The lower portion forms a region for the collection of water and/or heavy contaminants. A number of fuel processor components may be mounted to lower plate 46. Such components may be devices which do one or more of the following; provide an indication of the presence of water or other contaminants, automatically drain contaminants, sense the temperature of the collected contaminants, and heat the fuel. In its simplest form, fuel processor lower plate 46 would include only water sensor 74 and manually operated drain valve 76. This configuration would preferably provide the operator with a warning indicator that a quantity of water or other contaminants has collected in the lower portion of housing 38, therefore requiring manual actuation of drain valve 76.

In a more sophisticated configuration for fuel processor 36, a signal from water sensor 74 could be used to actuate an automatic drain valve (or a pump when processor 36 is used on the negative pressure side of a fuel system) such that water or other contaminants are automatically drained once they collect above a predetermined level within housing 38. Such a configuration would further preferably include temperature sensor 80 which would prevent the automatic drain valve from operating when the water or other contaminant temperature is below a predetermined temperature, thereby avoiding problems of operation of the drain valve when ice crystals are present which could lead to damage or improper operation of the drain valve. Fuel processor 36 as shown by FIGS. 3 and 4 further includes electric heating element 82 which is provided in the lower chamber area and is bent in an inverted U-shaped form having its lower ends in communication with bottom plate 46 (through electrical connections 84). The upper end of heating element 82 is positioned close to gap 86 which is formed by the lower bottom portion of filter media element 52. As is best shown in FIG. 4, the bight portion 88 of heater element 82 is slightly spaced from the wall of housing 38 and annular gap 86.

When heat energy is supplied to heater element 82, it becomes warmed quickly and fuel in the vicinity of the heating element is also warmed. Therefore, if wax crystals are formed which prevent fuel flow through filter media element 52, the heat generated by heating element 82 causes a "window" to be formed at gap 86 which presents a flow path for fuel through the filter media element. This "window" is maintained until the fuel within the fuel processing apparatus, the fuel within the fuel supply, and the engine itself can reach steady state temperatures above the waxing point of the fuel. When fuel in the lower portion of housing 38 is warmed, it, of course, flows upwardly through annular gap 86. Such warming of the entire fuel processor apparatus 36 is enhanced in accordance with this invention since filter mounting block 10 is typically located on, or in close proximity with, an engine or other heat source and therefore receives radiant heat from the assembly. It is also desirable that the energy to heating element 82 be controlled by, as an example, an automatic control device which receives a signal from temperature sensor 80 and therefore supplies heat energy to element 82 only when necessary. Various approaches toward providing automatic control of fuel processor devices which are equally applicable to the inventions described herein are detailed in copending U.S. patent application Ser. No. 463,041 assigned to the assignee of this invention.

Other heat sources could be used and could be of any basic type which provides the heat required to maintain a "window" within gap 86 when the temperature drops below the fuel's cloud or wax point. Heating element 82 is positioned to concentrate heat onto filter element 52 in such a manner to take advantage of the laws of thermodynamics and physics to minimize caloric input requirements. The heater can be of any type and can be self-regulated, or regulated by an internal or external thermostat or temperature sensor. Heater energy may be furnished electrically or by using any other source of heat such as water, fuel, oil, exhaust, air, radiation, or other available source of energy. The heater configuration can be any which meets the requirements dictated by the flow rate of fuel and usage conditions.

In operation, fuel is caused to travel through filter mounting block inlet passage 40 into inlet passages 54 to the area within housing 38 surrounding filter media element 52. Thereafter, water and heavy particulate matter collects within the lower portion of housing 38. After passing through filter media element 52, the fuel enters ports 62 and through outlet passageway 42.

Figure 5:
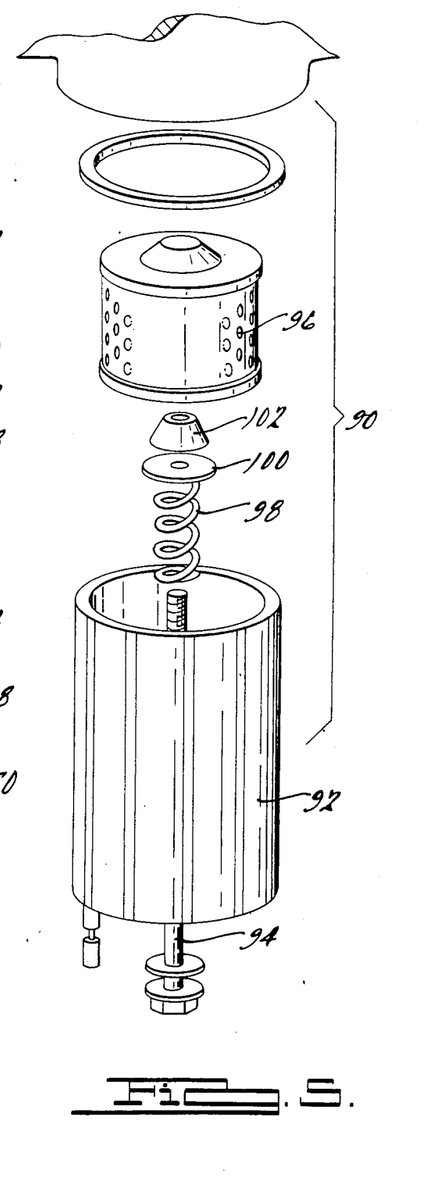
FIG. 5 is a second alternate embodiment of this invention shown as an exploded pictorial view wherein the fuel processor housing is integrated into the lower structure which supports the fuel processing elements.
Figures 6, 7, 8, 10, 12:
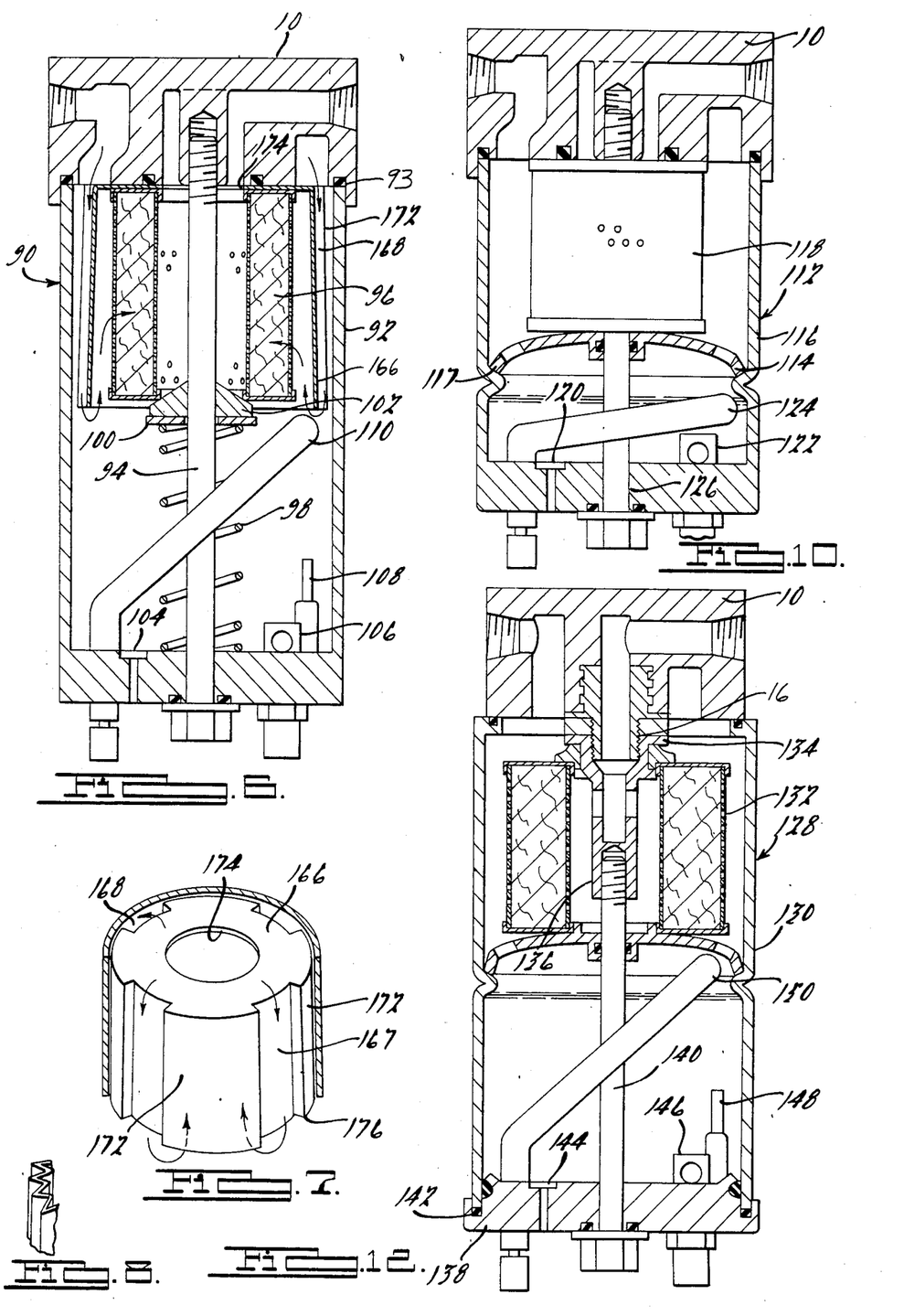
FIG. 6 is a longitudinal sectional view of the fuel processor device shown by FIG. 5 in an assembled configuration and further illustrating use of a baffle to define a flow channel to prevent untreated fuel from contaminating the filter media.
FIG. 7 is a pictorial view of a baffle shown in FIG. 6.
FIG. 8 is a partial pictorial view of a modified form of a baffle.
FIG. 10 is a longitudinal sectional view of the fuel processor device shown by FIG. 9 in an assembled configuration.
FIG. 12 is a longitudinal sectional view of the fuel processor device shown by FIG. 11 in an assembled configuration.

FIGS. 5, 6, and 7 illustrate fuel processor device 90 according to a second embodiment of this invention. This embodiment differs from that described with reference to FIGS. 3 and 4 in that it is particularly adaptable for use in replacing cartridge fuel filter 26 illustrated by FIG. 2. Housing 92 includes a lower plate structure which is integral with the housing. Attachment of housing 92 is achieved by providing through bolt 94 having sufficient length to engage the threaded bore within filter mounting block 10. Sealing of housing 92 against mounting block 10 is provided by seal 93. Internally, fuel processor 90 varies from that described by FIG. 4 in that stanpipe 58 is eliminated and filter media element 96 seals directly against filter block 10. Filter element 96 is held in sealing engagement with the filter block by compression of coil spring 98 against washer 100 and ring seal 102. Fuel processor 90 is shown having temperature sensor 104, drain valve 106, water sensor 108 and heater 110. As previously explained, fewer elements may be installed within the fuel processor, depending on the mode of operation desired.

In conjunction with this embodiment and with particular reference to FIGS. 6, 7 and 8, an additional improvement is shown. This improvement comprises the addition of baffle 166 which is provided to prevent incoming fuel from directly contacting filter media element 96 prior to its flow into the lower portion of fuel processor housing 92. By preventing such direct contact, particulate matter and water contained within the incoming fuel is kept from contaminating the filter element. Instead, the incoming fuel is directed into the lower portion of housing 92 where water and heavy particulates are removed from the fuel prior to its flow through filter element 96. Baffle 166 is generally cup-shaped having a central port 174 and having an outer cylindrical surface characterized in that it preferably has portions lying on cylindrical surfaces of differing radial dimensions. The side surfaces of baffle 166 would preferably be slightly inclined in order to provide a draft angle, thereby facilitating production by injection molding processes. Baffle 166 extends downwardly to a point below the lower surface of filter element 96. As shown particularly by FIG. 7, a plurality of indented portions 167 and a plurality of radially extending portions 172 are provided. Now with particular reference to FIG. 6, the flow of fuel through fuel processor 90 is described. Fuel flowing into fuel processor 90 is directed along the outside surface of baffle 166 and within channels 168 formed by radially indented portions 167. Such flow is indicated by downwardly directed arrows in FIGS. 6 and 7. Once fuel has been directed into the lower portion of housing 92, heavy particulate matter and water is separated therefrom. Thereafter, fuel flowing upwardly toward filter media element 96 is directed along the inter surface of baffle 166 within channels 176 formed by radially extending portions 172.

Baffle 166 may be provided as a separate component as shown by FIG. 7 or may be integrated into a fuel processor housing or filter structure. Additionally, numerous other forms of baffle 166 can be provided which perform the above-described function. For example, baffle 166 may have a true cylindrical surface without the inwardly or outwardly directed extending portions described above provided that annular clearances for fuel flow exist both around the outside and within the baffle. Also, as shown by the partial pictorial view of FIG. 8, a large number of inwardly and outwardly extending portions could be provided, giving the baffle a corrugated appearance.

By providing baffle 166 in conjunction with heating element 110, direct contact between cold incoming fuel and the filter media element is prevented. Therefore, only warmed fuel directly contacts the filter element thereby aiding in the prevention of a solid accumulation of cold fuel and water globules from developing on the outer surface of the media element. In addition to the above-described benefits, baffle 166 enhances the water separating characteristics of the associated fuel processor by presenting a large surface area which acts to coalesce water suspended within the fuel. Moreover, baffle 166 improves the thermal efficiency of the fuel processor by separating the cold incoming fuel from the warmed fuel.

Baffle 166 is explained and depicted in conjunction with one embodiment of a fuel processor device for illustrative purposes only. Baffle 166 is equally suitable for any of the remaining embodiments described as part of this specification. Moreover, baffle 166 is suitable for use with any type of filter in which it is desirable to prevent direct contact between incoming fluid and the filter media element.

Figures 9, 11, 13:
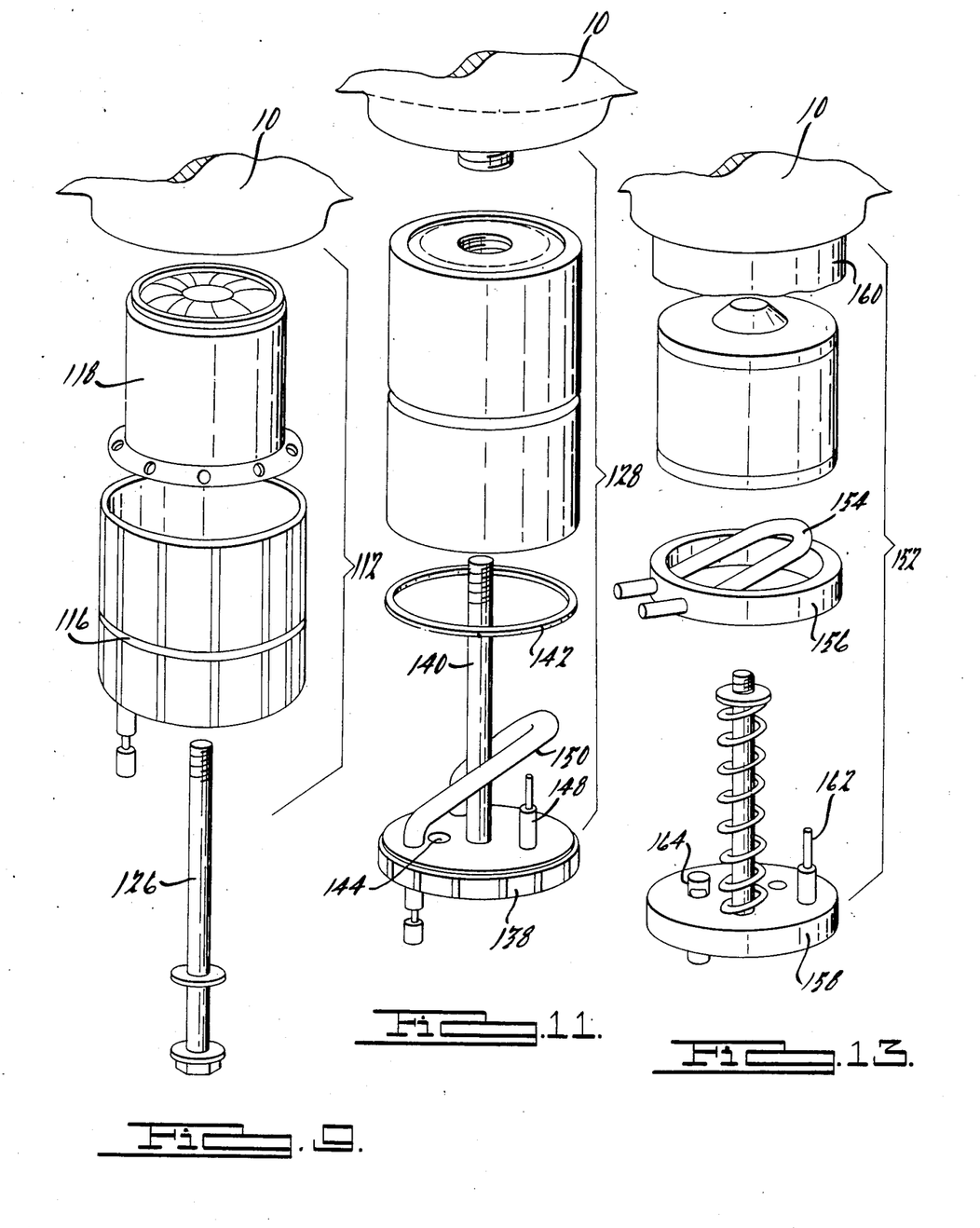
FIG. 9 is a third embodiment according to this invention shown as an exploded pictorial view wherein alternate means for mounting a throw-away filter element within the housing is described.
FIG. 11 is a fourth embodiment of this invention shown in an exploded pictorial view which employs an integral housing and filter element.
FIG. 13 is a fifth embodiment of this invention shown in exploded pictorial view illustrating a device having an intermediate annular ring which may be used as a spacer or may support a heater element in accordance with the needs of the user.

FIGS. 9 and 10 illustrate a third embodiment according to this invention wherein fuel processor 112 is shown. This embodiment varies from that described by FIGS. 5, 6 and 7 in that coil spring 98 for resiliently biasing filter media element 96 in sealing contact with filter mounting block 10, is eliminated. For this embodiment, an internally disposed annular rib 114 is provided within housing 116 which engages a downwardly projecting flange 117 of filter element 118 to bias it against filter block 10. This embodiment is also suitable for replacement of a cartridge type fuel filter apparatus described by FIG. 2. Like the previous embodiments, fuel processor 112 preferably includes; temperature sensor 120, drain valve 122, heater 124 and through bolt 126.

FIGS. 11 and 12 illustrate fuel processor 128 according to a fourth embodiment of this invention wherein housing 130 and filter media element 132 are integrated such that both are replaced when the filter element becomes contaminated. An upper plate 134 forms a threaded bore for engagement with threaded boss 16. Stanpipe 136 provides a means for fastening lower plate 138 against seal 142 to housing 130 using through bolt 140. Other means for attaching lower plate 138 to housing 130 could be provided, for example, by theading engagement therebetween. As illustrated by FIGS. 11 and 12, fuel processor 128 also preferably includes; temperature sensor 144, drain valve 146, water sensor 148 and heater 150.

FIG. 13 illustrates a fifth embodiment of a fuel processor 152 which differs from the previous embodiments in that electric heating element 154 is attached to an intermediate annular ring 156 which is positioned between lower plate 158 and housing 160 (shown cut away in FIG. 13). This enables fuel processor device 152 to be readily adapted between operating conditions wherein a heating device is desirable and those wherein it is unnecessary. In the latter situation, annular ring 156 would simply be provided as a spacer without including heating element 154. Annular ring 156 also provides a convenient mounting location for a temperature sensor (not shown). Lower plate 158 preferably carries water sensor 162 and drain valve 164.

While the above description constitutes the preferred embodiments of the present invention, it will be appreciated that the invention is susceptible to modification, variation and change without departing from the proper scope and fair meaning of the accompanying claims.

What is claimed is:

1. A unitary fuel processing and filtering unit, particularly for diesel fuel and operative to separate out water and impurities from the fuel adapted to be mounted to a mounting head having a fuel inlet passage and a fuel outlet passage comprising a housing including a lower portion defining a combined heating and sediment chamber, a concentric annular shaped filtering means positioned within an upper portion of said housing, a top plate having a fuel inlet and fuel outlet, means for conducting said fuel from said top plate inlet to said chamber, and means defining a passage for conducting fuel from said chamber to said filtering means, characterized by heating means in said lower portion operative to heat the incoming fuel by direct contact therewith in said chamber, said heating means including a heated portion in close proximity to said passage, and said heating means extends through a substantial part of the lower portion.

2. A fuel processing and filtering unit according to claim 1 further comprising heater means disposed within said lower portion of said housing.

3. A fuel processing and filtering unit according to claim 1 further comprising temperature sensing means disposed with said lower portion of said housing.

4. A fuel processing and filtering unit according to claim 3 further comprising control means which modulates energy supplied to said heater means in response to temperature sensed by said temperature sensing means.

5. A fuel processing and filtering unit according to claim 1 wherein said quantity sensing means provides a signal when a first predetermined quantity of water or other impurity exists within said housing.

6. A fuel processing and filtering unit according to claim 5 wherein said drain means is operable in response to a control signal and further comprising a second automatic control means which causes said drain means to open when said first predetermined quantity or other impurity is sensed by said quantity sensing means thereby draining said water or other impurities from said housing.

7. A fuel processing and filtering unit according to claim 6 further comprising temperature sensing means and control means whereby said drain means is prevented from draining when a temperature is sensed within said fuel processing and filtering unit by said temperature sensing means is less than a predetermined liquid temperature level.

8. A fuel processing and filtering unit according to claim 7 wherein said predetermined temperature level is below the freezing point of water.

9. A fuel processing and filtering unit according to claim 1 wherein said quantity sensing means provides signals in response to a first and second predetermined quantity of water or other impurity within said housing, wherein said first predetermined quantity if greater than said second predetermined quantity.

10. A fuel processing and filtering unit according to claim 9 wherein said drain means is operable in response to a control signal and further comprising a second automatic control means which causes said drain means to open when said first predetermined quantity is sensed, thereby draining said water or other impurity from said housing and said drain closing when said second predetermined quantity is sensed, thereby maintaining the quantity of said water or other impurities within said housing generally between said first and second predetermined quantities.

11. A fuel processing and filtering unit according to claim 10 further comprising temperature sensing means and control means whereby said drain means is prevented from draining when a temperature is sensed by said temperature sensing means is less than a predetermined temperature level.

12. A fuel processing and filtering unit according to claim 11 wherein said predetermined temperature level is below the freezing point of water.

13. A fuel processing and filtering unit according to claim 1 wherein said housing has an opened lower end, and said quantity sensing means and said drain means are mounted to a lower plate which sealingly engages said housing.

14. A fuel processing and filtering unit according to claim 13 further comprising a bolt fastener means which retains said lower plate and said vessel in position with respect to said filter head.

15. A fuel processing and filtering unit according to claim 13 wherein heater means and temperature sensing means are mounted to said lower plate.

16. A fuel processing and filtering unit according to claim 13 wherein heater means is mounted to a spacer interposed between said housing and said lower plate.

17. A fuel processing and filtering unit according to claim 1 wherein said housing is formed to have a closed bottom end.

18. A fuel processing and filtering unit according to claim 17 wherein said quantity sensing means and said drain valve means are mounted to said closed bottom end.

19. A fuel processing and filtering unit according to claim 18 further comprising a heater and a temperature sensor which are mounted to said closed bottom end.

20. A fuel processing and filtering unit according to claim 1 wherein said filtering means is a replaceable element.

21. A fuel processing and filtering unit according to claim 20 further comprising a mounting means acting upon said filter means thereby maintaining said filter means in sealing engagement with said seal means.

22. A fuel processing and filtering unit according to claim 20 further comprising an upper web disposed within the upper portion of said housing.

23. A fuel processing and filtering unit according to claim 22 further comprising a through bolt engageable with said web retaining said filter in sealing engagement with said web.

24. A fuel processing and filtering unit according to claim 23 wherein said web forms a threaded bore which engages a threaded boss formed by said filter mounting block.

25. A fuel processing and filtering unit according to claim 22 further comprising a through bolt engageable with said filter mounting block thereby retaining said fuel processing and filtering unit in sealing engagement with said filter mounting block.

26. A fuel processing and filtering unit according to claim 20 wherein said filtering means engages said housing such that said filtering means sealingly engages said mounting head when said housing is mounted thereto.

27. A fuel processing and filtering unit according to claim 34 wherein said filtering means is integrated with said housing.

28. A fuel processing and filtering unit according to claim 27 wherein said housing includes a threaded bore which engages a threaded boss formed by said mounting head.

29. A unitary fuel processing and filtering unit according to claim 1 further comprising quantity sensing means for detecting the presence of water or other impurities within said lower portions of said housing and drain means for permitting the draining of said water or other impurities from said housing.

30. A component for a unitary fuel processing and filtering unit, particularly for diesel fuel and operative to separate out water and impurities from the fuel adapted to be mounted to a mounting head having a fuel inlet passage and fuel outlet passage and heating means, comprising:

a housing including a lower portion defining a combined heating and sediment chamber, a concentric annular shaped filtering means positioned within an upper portion of said housing, a top plate having a fuel inlet and a fuel outlet, means for conducting said fuel from said top plate inlet to said chamber, and means defining a passage for conducting fuel from said chamber to said filtering means, wherein said heating means is disposed in said chamber lower portion operative to heat the incoming fuel by direct contact therewith in said chamber, said heating means positioned in close proximity to said passage, and said heating means extending through a substantial part of said lower portions.

31. A component for a unitary fuel processing and filtering unit according to claim 30 further comprising said housing defining a lower opened end and a lower plate assembly adapted to support said heating means and mounted to enclose said lower opened end.

32. A unitary fuel processing and filtering unit according to claim 30 wherein said lower plate assembly includes a drain and quantity sensing means for detecting the presence of water or other impurities within the lower portion of said housing.

33. A unitary fuel processing and filtering unit according to claim 31 wherein said lower plate assembly includes heater means.

34. A unitary fuel processing and filtering unit according to claim 31 wherein said lower plate assembly includes temperature sensing means.

35. A unitary fuel processing and filtering unit according to claim 31 wherein said housing opened end forms threads for threading engagement between said housing and said lower plate assembly.

* * * * *

UNITED STATES PATENT AND TRADEMARK OFFICE
CERTIFICATE OF CORRECTION

PATENT NO. : 4,680,110

DATED : July 14, 1987

INVENTOR(S) : Leland L. Davis

It is certified that error appears in the above-identified patent and that said Letters Patent is hereby corrected as shown below:

Under References Cited U.S. Patent Doc. page 2; "4,420,342" should be -- "4,420,392

| Col. | Line | |
|---|---|---|
| 1 | 58 | "," should be -- . -- |
| 8 | 39 | "if" should be -- is -- |
| 9 | 47 | "34" should be -- 1 -- |

Signed and Sealed this

Nineteenth Day of April, 1988

Attest:

DONALD J. QUIGG

*Attesting Officer*  *Commissioner of Patents and Trademarks*